US007296170B1

(12) United States Patent
Richmond et al.

(10) Patent No.: US 7,296,170 B1
(45) Date of Patent: Nov. 13, 2007

(54) CLOCK CONTROLLER WITH CLOCK SOURCE FAIL-SAFE LOGIC

(75) Inventors: Melany Ann Richmond, Shoreline, WA (US); Robert Walter Metzler, Jr., Kirkland, WA (US)

(73) Assignee: Zilog, Inc., San Jose, CA (US)

( * ) Notice: Subject to any disclaimer, the term of this patent is extended or adjusted under 35 U.S.C. 154(b) by 413 days.

(21) Appl. No.: 10/764,391

(22) Filed: Jan. 23, 2004

(51) Int. Cl.
*G06F 1/00* (2006.01)
(52) U.S. Cl. .................. 713/324; 713/300; 327/18; 327/20; 327/144; 327/152; 327/292; 327/298; 714/2; 714/47; 714/798; 714/799
(58) Field of Classification Search .......... 713/1, 713/300–601; 327/18, 20, 144, 152, 292, 327/298; 714/2, 47, 798, 799
See application file for complete search history.

(56) References Cited

U.S. PATENT DOCUMENTS

| | | | | |
|---|---|---|---|---|
| 4,144,448 A | | 3/1979 | Pisciotta et al. ............ 235/301 |
| 4,255,789 A | * | 3/1981 | Hartford et al. ............ 701/108 |
| 4,374,361 A | | 2/1983 | Holden ........................ 328/120 |
| 4,379,993 A | | 4/1983 | Holden ........................ 328/120 |
| 4,653,054 A | * | 3/1987 | Liu et al. ..................... 714/814 |
| 4,698,829 A | | 10/1987 | Di Giulio .................... 377/16 |
| 5,369,377 A | * | 11/1994 | Benhamida .................. 331/49 |
| 5,404,363 A | * | 4/1995 | Krause et al. ............... 714/814 |
| 5,418,481 A | | 5/1995 | Sikkink et al. ............... 327/20 |
| 5,511,209 A | | 4/1996 | Mensch, Jr. ................ 395/800 |
| 5,517,638 A | | 5/1996 | Szczepanek ................ 395/550 |
| 5,561,390 A | | 10/1996 | Hiiragizawa ................ 327/147 |
| 5,561,792 A | | 10/1996 | Ganapathy ................... 395/550 |
| 5,604,452 A | | 2/1997 | Huang .......................... 327/99 |
| 5,790,609 A | | 8/1998 | Swoboda ..................... 375/357 |
| 5,828,243 A | | 10/1998 | Bagley ......................... 327/99 |
| 6,008,671 A | | 12/1999 | Kang ........................... 327/20 |
| 6,246,261 B1 | | 6/2001 | Monceau ...................... 326/46 |
| 6,266,780 B1 | * | 7/2001 | Grundvig et al. ........... 713/501 |
| 6,292,045 B1 | * | 9/2001 | Bongiorno et al. ......... 327/298 |
| 6,341,355 B1 | | 1/2002 | Rutherford et al. ......... 713/501 |
| 6,429,698 B1 | | 8/2002 | Young .......................... 327/99 |
| 6,456,146 B1 | | 9/2002 | Darmon et al. ............. 327/407 |
| 6,469,544 B2 | | 10/2002 | Kimura ........................ 327/20 |
| 6,556,044 B2 | * | 4/2003 | Langhammer et al. ........ 326/40 |
| 6,816,979 B1 | * | 11/2004 | Chen et al. .................. 713/400 |

(Continued)

*Primary Examiner*—James K. Trujillo
*Assistant Examiner*—James F. Sugent
(74) *Attorney, Agent, or Firm*—Imperium Patent Works; Darien K. Wallace

(57) ABSTRACT

A microcontroller integrated circuit with a clock controller and a processor automatically switches the source of the clock signal that clocks the processor from a failed fast external precision oscillator to a slow internal backup oscillator, then enables a fast internal precision oscillator, and finally switches to the fast internal precision oscillator. A failure detection circuit within the clock controller detects a failure of the external precision oscillator and sends an associated interrupt signal to the processor. The clock controller decouples the external oscillator from the processor and couples the backup oscillator to the processor. The microcontroller integrated circuit then enables the fast internal precision oscillator, decouples the backup oscillator, and couples the fast internal precision oscillator to the processor. The microcontroller integrated circuit conserves power by powering up the fast internal precision oscillator only after the external clock source has failed and by then disabling the failure detection circuit.

21 Claims, 13 Drawing Sheets

SWITCHING FROM A FAILED
CLOCK TO A NEW CLOCK

U.S. PATENT DOCUMENTS

| | | | |
|---|---|---|---|
| 6,845,454 B2 * | 1/2005 | Kim | 713/300 |
| 6,938,176 B1 * | 8/2005 | Alben et al. | 713/323 |
| 6,970,045 B1 * | 11/2005 | Lichter et al. | 331/2 |
| 7,062,675 B1 * | 6/2006 | Kemeny et al. | 714/15 |
| 2002/0091785 A1 * | 7/2002 | Ohlenbusch et al. | 709/208 |
| 2002/0091961 A1 * | 7/2002 | Inoue | 713/601 |
| 2003/0079152 A1 * | 4/2003 | Triece | 713/322 |

* cited by examiner

CLOCK CONTROLLER

CLOCK ENABLE SELECTION

| OUTPUTS FROM CLOCK ENABLE SELECTION 35 | | | INPUTS OF DECODER 51 |
|---|---|---|---|
| PriClkSel A3 | SecClkSel B3 | TerClkSel N3 | OscSel [1:0] |
| 1 | 0 | 0 | 00 |
| 0 | 1 | 0 | 01 |
| 0 | 0 | 1 | 10 |
| 0 | 0 | 0 | 11 |

PRIMARY CLOCK
SOURCE FAIL DETECT

OSCILLATOR CONTROL LOGIC

CLOCK MULTIPLEXER

SWITCHING FROM A FAILED CLOCK TO A NEW CLOCK

CLOCK CONTROLLER WITH CLOCK SOURCE FAIL-SAFE LOGIC

TECHNICAL FIELD

The present invention relates generally to circuits for switching clock sources and, more specifically, to a circuit for automatically switching from a failed clock source to a new clock source.

BACKGROUND

Microcontrollers see use in many instrumentation and control applications. In some applications, the microcontroller integrated circuits must be capable of both failsafe operation as well as low power operation. An example of an application involving failsafe and low power operation is a battery-powered detecting circuit for poison gas, such as carbon monoxide. Other examples of failsafe, low power applications include battery-powered medical devices that are implanted into the human body. Failsafe operation of such microcontroller integrated circuits allows the microcontroller to continue to execute instructions even after the failure of an external oscillator that supplies a clock signal to the microcontroller. If such a failure occurs, then a second clock signal is supplied to the microcontroller so that the microcontroller can continue to operate.

Circuits for automatically detecting a failure of a clock source and for switching a system clock from the failed clock source to a second clock source are known. See, for example, U.S. Pat. No. 6,341,355. If a failsafe device incorporating a microcontroller were to be provided with such an automatic clock switchover circuit, then the failsafe device would include two sources of clock signals. When a clock signal provided from one source fails, then the automatic clock switchover circuit would supply the microcontroller with a clock signal from the second clock source. Presumably both clock sources would be running at the same time so that when one of the clock sources would fail, the other clock source would be able to provide the clock signal needed to clock the microcontroller. Although failsafe operation is achieved, the power consumption of the overall device would likely be high because the overall device would include two clock sources that are consuming power.

In low power microcontroller applications, the power consumed by the oscillator that supplies the microcontroller with its clock signal may be a significant proportion of the total power consumed by the overall device. Battery lifetime may therefore be substantially adversely affected by the need to provide power to two clock sources. A solution is desired whereby failsafe operation can be provided, while at the same time reducing power consumption relative to conventional automatic clock switchover circuits.

SUMMARY

A failsafe and low-power microcontroller integrated circuit includes a processor, an internal low-power clock source, an internal higher precision and relatively high-speed clock source, and a clock controller. The processor within the microcontroller integrated circuit is initially clocked by a primary clock signal received from an external high-speed precision oscillator. The external high-speed precision oscillator may, for example, be an external crystal oscillator. Due to the high-speed operation of the external oscillator and due to its large physical size, the external oscillator exhibits a relatively high power consumption in comparison to the internal low-power clock source.

The internal low-power clock source may, for example, be an internal watchdog timer oscillator that oscillates at a frequency significantly lower than the frequency of the external oscillator. The internal low-power clock source may, for example, be an RC oscillator that outputs a clock signal whose frequency is less stable over temperature and voltage than is the primary clock signal supplied by the external oscillator.

Initially, the internal low-power clock source is enabled and generates a low-speed clock signal, whereas the internal higher precision clock source is disabled. The clock controller monitors the primary clock signal received from the external high-speed precision oscillator.

If the clock controller detects that the primary clock signal is inadequate, then the clock controller automatically switches the source of the clock signal that clocks the processor by decoupling the external high-speed oscillator from the clock input lead of the processor and by later coupling the internal low-power clock source to the clock input lead of the processor. The clock controller uses the clock signal output by the internal low-power clock source to perform this switching of clock signals.

In addition to switching the source of the clock signal supplied to the processor, the clock controller also generates and sends an interrupt signal to the processor. The processor, which is now being clocked by the internal low-power clock source, slowly executes instructions and services the interrupt by jumping to an associated interrupt service routine. Execution of an instruction in the interrupt service routine causes a write to the clock controller, which in turn causes the clock controller to enable (for example, to power up) the internal higher precision and high-speed clock source.

Once the internal higher precision clock source is powered up and is generating a high-speed precision clock signal, then the clock controller switches the source of the clock signal that clocks the processor from the internal low-power oscillator to the internal higher precision oscillator. In one embodiment, the internal higher precision oscillator is coupled to an external component (for example, a crystal) disposed outside the microcontroller integrated circuit.

Failsafe operation is provided by automatically switching from the failed clock source to the internal low-power backup clock source without introducing glitches onto the clock input lead of the processor. The microcontroller integrated circuit conserves power by powering up the internal precision high-speed oscillator only after detecting that the clock signal from the external oscillator is inadequate. Power consumption is further reduced by disabling circuitry of the clock controller that detects whether the primary clock signal from the external oscillator is inadequate once the primary clock signal has been determined to be inadequate.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
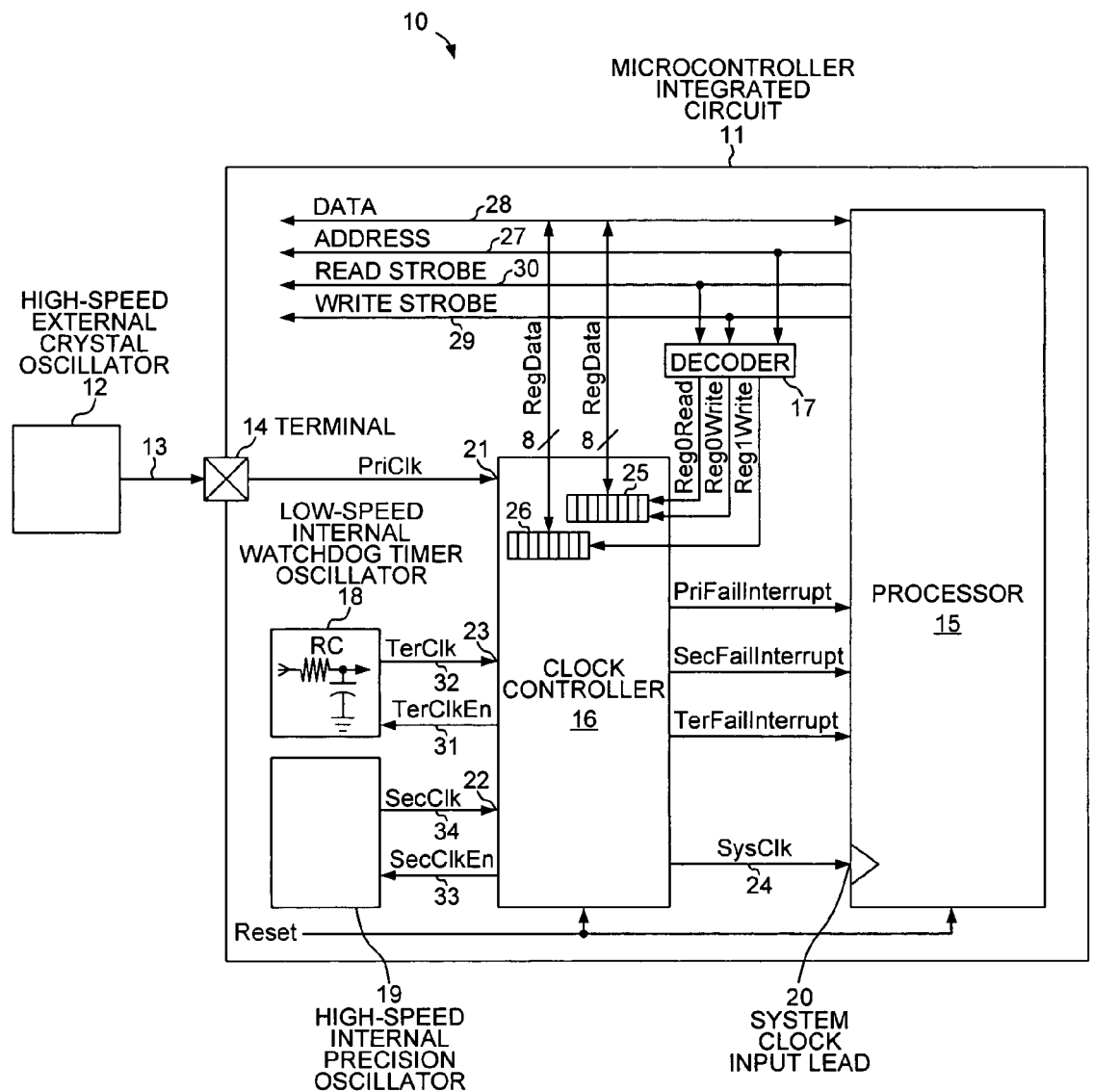
FIG. 1 is a system-level diagram of a microcontroller integrated circuit with a clock controller in accordance with one specific embodiment.

FIG. 1 is a system-level diagram of a microcontroller system 10 in accordance with one specific embodiment. Microcontroller system 10 includes a microcontroller integrated circuit 11 and a high-speed external crystal oscillator 12. External crystal oscillator 12 provides a high-speed clock signal via line 13 to a terminal 14 of microcontroller integrated circuit 11. Microcontroller integrated circuit 11 includes a processor 15, a clock controller 16, an address decoder 17, a low-speed internal watchdog timer oscillator 18, and a high-speed internal precision oscillator 19. Clock controller 16 outputs one of three clock signals onto a system clock line 24 and to a system clock input lead 20 of processor 15. The three clock signals are: (i) a primary clock signal (PriClk) present on an input lead 21, (ii) a secondary clock signal (SecClk) present on an input lead 22, and (iii) a tertiary clock signal (TerClk) present on an input lead 23.

Clock controller 16 includes a programmable oscillator control register 25 and a fail interrupt register 26. Processor 15 can both read from and write to each of these two registers 25 and 26. To write to oscillator control register 25, processor 15 outputs the address of oscillator control register 25 onto address bus 27 of the processor. Processor 15 outputs the data to be written into oscillator control register 25 onto data bus 28 and then outputs a write strobe signal onto write strobe output line 29. Address decoder 17 generates a write strobe signal Reg0Write when it detects the address of oscillator control register 25 being present on address bus 27 at the same time that the write strobe is detected on write strobe line 29. When the write strobe signal Reg0Write is supplied to oscillator control register 25, the data on data bus 28 is clocked into oscillator control register 25.

Processor 15 can also read from oscillator control register 25. To read from oscillator control register 25, processor 15 supplies the address of the oscillator control register onto address bus 27 and then outputs a read strobe signal onto read strobe line 30. When decoder 17 detects the address of oscillator control register 25 on address bus 27 at the same time that the read strobe signal is present on read strobe line 30, decoder 17 outputs a read strobe (Reg0Read). When oscillator control register 25 receives the read strobe Reg0Read, it outputs its contents onto data bus 28. Fail interrupt register 26 is read from and written to by processor 15 in similar fashion.

In the specific embodiment of FIG. 1, internal watchdog timer oscillator 18 is a low-speed, and therefore relatively low-power, RC oscillator. It is, however, less stable than would be desired to clock processor 15 during normal operation. If an enable signal TerClkEn on a tertiary clock enable line 31 is a digital logic level low, then the internal watchdog timer oscillator 18 is disabled and is prevented from oscillating. If, on the other hand, the TerClkEn signal is a digital logic level high, then internal watchdog timer oscillator 18 is enabled such that it oscillates and outputs the tertiary clock signal (TerClk) onto a tertiary clock line 32.

In the specific embodiment of FIG. 1, internal precision oscillator 19 is an oscillator that provides a relatively stable and high-speed clock signal in comparison to the less stable tertiary clock signal (TerClk) output by internal watchdog timer oscillator 18. Internal precision oscillator 19 is entirely on-chip and does not have an external crystal. For example, internal precision oscillator 19 is trimmed to precisely 5.2 MHz and exhibits jitter of less than 20 parts per million (ppm) over its operational temperature range, its operational voltage range and over process variation. In comparison to internal watchdog timer oscillator 18, however, internal precision oscillator 19 consumes a substantially larger amount of power. Internal precision oscillator 19 can be disabled such that it does not oscillate and thereby consumes minimal power. If an enable signal SecClkEn on a secondary clock enable line 33 is a digital logic level low, then internal precision oscillator 19 is disabled and is prevented from oscillating. If, on the other hand, the SecClkEn signal is a digital logic level high, then internal precision oscillator 19 is enabled such that internal precision oscillator 19 generates the clock signal SecClk and drives the SecClk signal onto a secondary clock line 34.

In operation, clock controller 16 has multiple clock source fail detect circuits for monitoring the clock signals received on clock signal input leads 21, 22 and 23. For example, if processor 15 is being clocked by the primary clock signal (PriClk) generated by external crystal oscillator 12, and if a clock source fail detect circuit within clock controller 16 detects that external crystal oscillator 12 ceases to output PriClk, then clock controller 16 automatically switches the source of the system clock (SysClk) supplied to processor 15 from external crystal oscillator 12 to internal watchdog timer oscillator 18. Processor 15 is then clocked by the tertiary clock signal (TerClk) generated by internal watchdog timer oscillator 18.

In one example of low power operation, internal precision oscillator 19 is initially disabled, is not oscillating, and is using only a minimal amount of power. One precision and high-power oscillator (external crystal oscillator 12) and one less stable but relatively low-power oscillator (low-speed internal watchdog timer oscillator 18) are oscillating. Two high-power oscillators are not operating.

When clock controller 16 detects that the primary clock signal (PriClk) output by precision oscillator 19 is inadequate, and when the source of the system clock (SysClk) provided to processor 15 switches from PriClk to TerClk, then clock controller 16 enables a second precision oscillator (internal precision oscillator 19) such that second precision oscillator begins oscillating, and starts generating the high-speed precision secondary clock signal (SecClk). The less stable clock signal TerClk output by internal watchdog timer oscillator 18 is used to clock the clock controller 16 such that clock controller 16 can switch the source of the system clock SysClk used to clock processor 15 from internal watchdog timer oscillator 18 to internal precision oscillator 19. Once the switch has been made, the more stable and higher frequency secondary clock signal SecClk clocks processor 15.

It is therefore seen that the specific embodiment of FIG. 1 does not require two precision and high-power clock sources to be maintained powered up and oscillating just so that the clock source can be switched from one to the other in the event a primary clock signal is inadequate. Rather, low power consumption is achieved by using one precision clock source 12 and one lower precision and lower power internal watchdog timer oscillator 18 during normal operation. When clock controller 16 detects that the primary clock signal output by the precision clock source 12 is inadequate, the less stable and lower power oscillator 18 clocks the clock controller circuitry so that clock controller 16 can power up a second precision oscillator (internal precision oscillator 19). Once the second precision oscillator is powered up and generating the second precision clock signal SecClk, then clock controller 16 switches the source of the clock signal supplied to processor 15 over to the second precision clock signal SecClk. Both low power and failsafe operation is therefore achieved. Additional details of the operation of the failsafe low-power circuit is described below.

Figure 2:
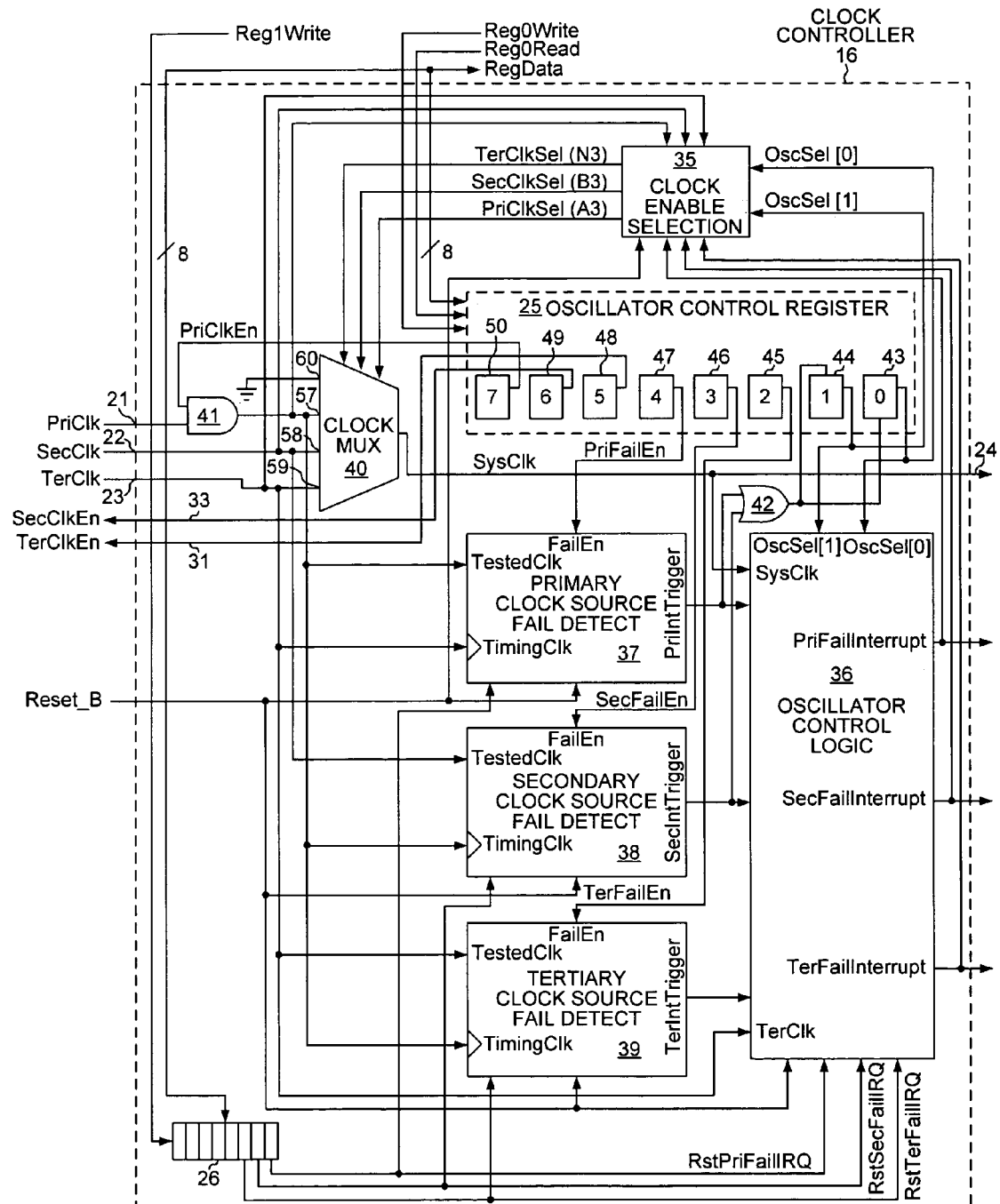
FIG. 2 is a simplified block diagram of the clock controller of FIG. 1.

FIG. 2 is a simplified block diagram of clock controller 16 of the specific embodiment of FIG. 1. Clock controller 16 includes a clock enable selection block 35, an oscillator control logic block 36, a primary clock source fail detect block 37, a secondary clock source fail detect block 38, a tertiary clock source fail detect block 39, oscillator control register 25, fail interrupt register 26, a clock multiplexer 40, an AND gate 41, and an OR gate 42. Oscillator control register 25 has eight bits: two oscillator selects bits (bit zero 43 and bit one 44), three oscillator failure detect enable bits (bit two 45, bit three 46 and bit four 47), and three clock source enable bits (bit five 48, bit six 49, and bit seven 50).

Figures 3, 7:
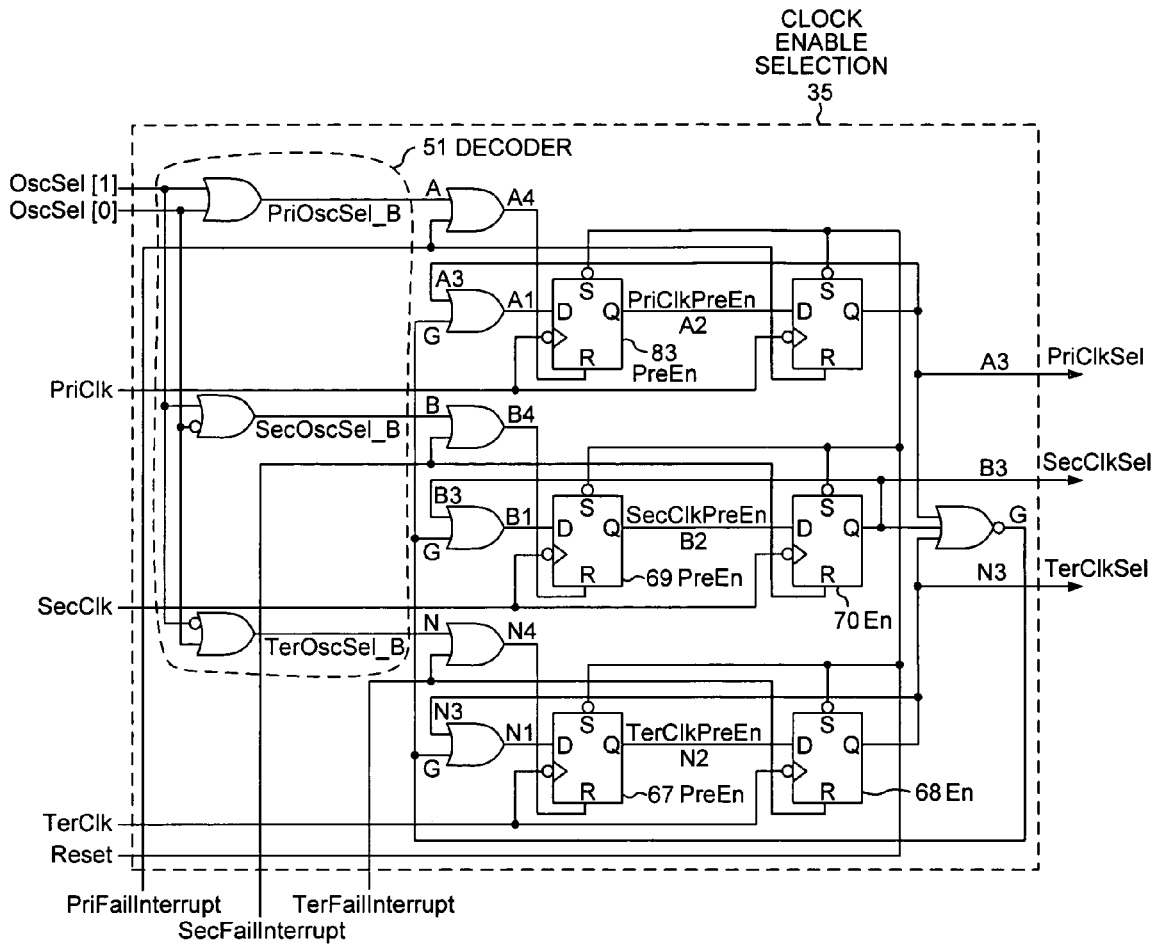
FIG. 3 is a simplified block diagram of a clock enable selection circuit of the clock controller of FIG. 2.
FIG. 7 is a table listing the decoding function performed by the clock enable selection circuit of FIG. 3.

FIG. 3 is a circuit diagram of clock enable selection block 35 of clock controller 16 of FIG. 2. Clock enable selection block 35 includes decoder 51.

Figure 4:
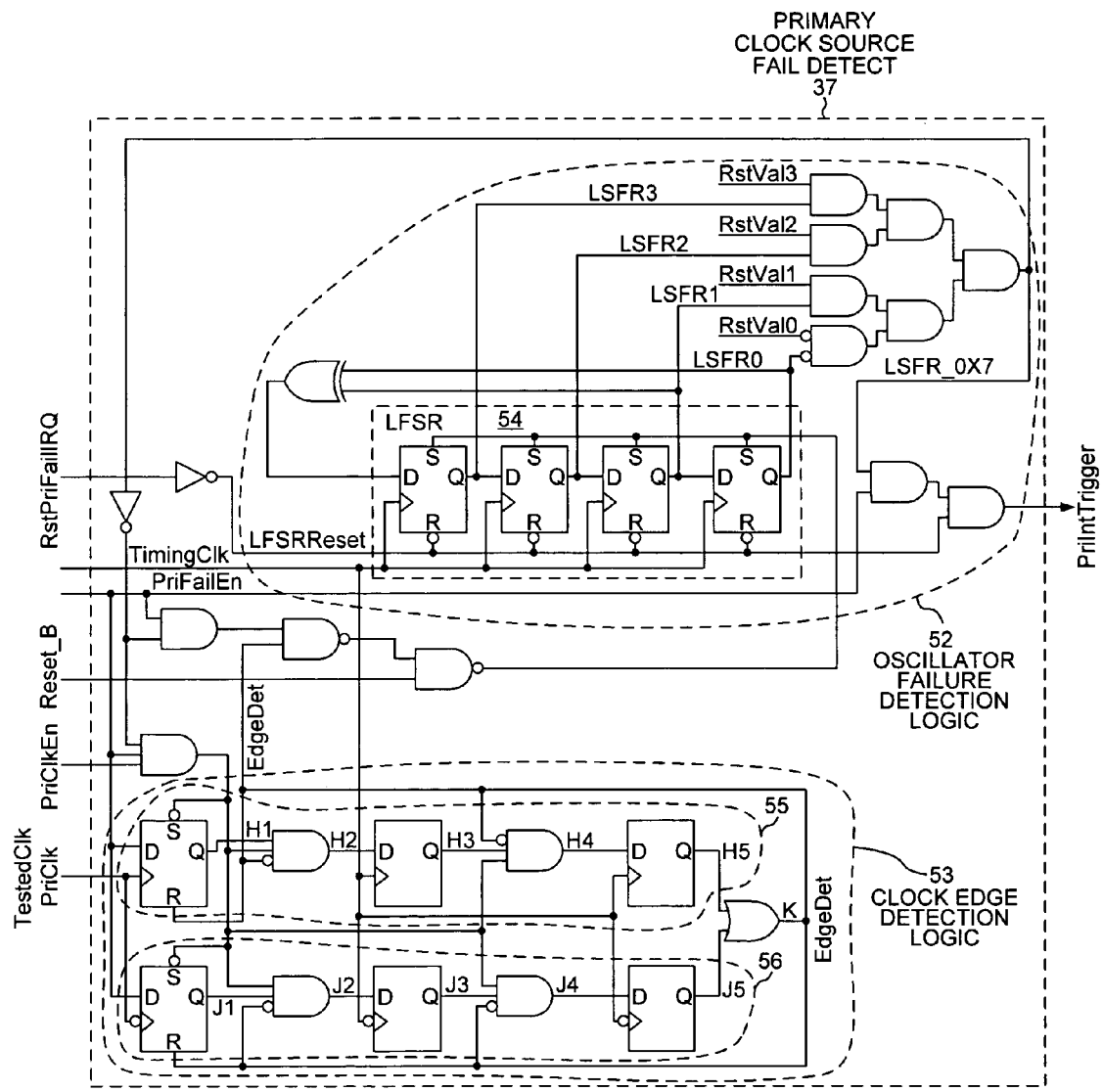
FIG. 4 is a simplified block diagram of a primary clock source fail detect block of the clock controller of FIG. 2.

FIG. 4 is a circuit diagram of primary clock source fail detect block 37 of clock controller 16 of FIG. 2. Primary clock source fail detect block 37 includes oscillator failure detection logic 52 and clock edge detection logic 53. Oscillator failure detection logic 52 includes a linear feedback shift register (LFSR) 54. Clock edge detection logic 53 includes a rising edge detection portion 55 and a falling edge detection portion 56. The circuitry of primary clock source fail detect block 37, secondary clock source fail detect block 38 and tertiary clock source fail detect block 39 are identical. The circuitry illustrated in FIG. 4 therefore represents the circuitry of blocks 37, 38 and 39 of FIG. 2.

Figure 5:
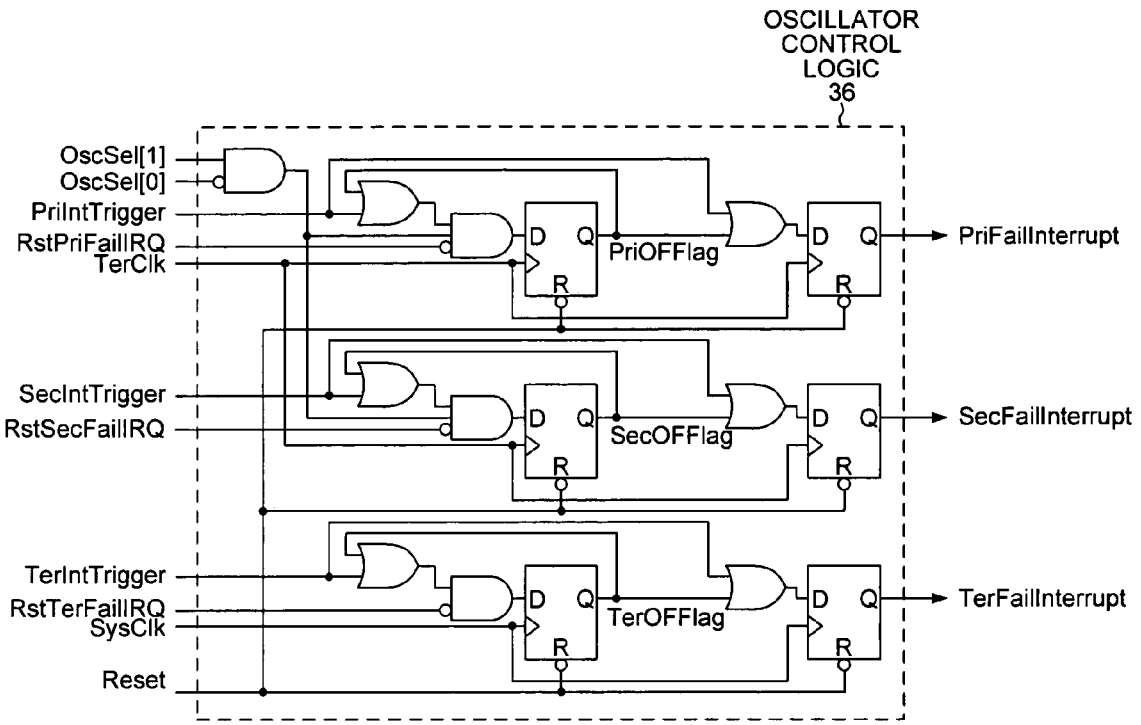
FIG. 5 is a simplified block diagram of an oscillator control logic block of the clock controller of FIG. 2.

FIG. 5 is a circuit diagram of oscillator control logic block 36 of FIG. 2. The signal PriOFFlag is the primary oscillator fail flag signal.

Figure 6:
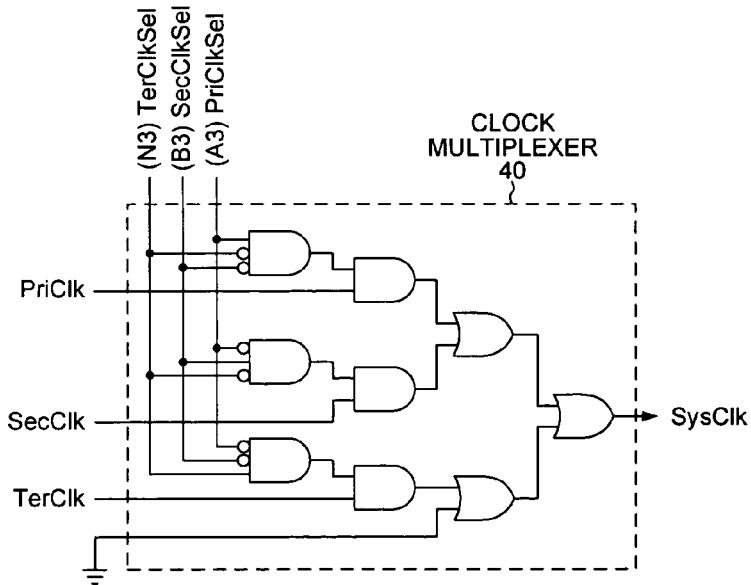
FIG. 6 is a circuit diagram of a clock multiplexer of the clock controller of FIG. 2.

FIG. 6 is a circuit diagram of clock multiplexer 40 of FIG. 2.

In FIG. 2, clock multiplexer 40 determines which one of PriClk on clock signal input lead 21, SecClk on clock signal input lead 22 and TerClk on clock signal input lead 23 is gated onto system clock input lead 20 of processor 15. Which one of these three clock signals is gated onto system clock input lead 20 is determined by the contents of bit zero 43 and bit one 44 of oscillator control register 25. The output of these two oscillator select bits 43 and 44 is provided to clock enable selection block 35 as oscillator select signal OscSel[0] and oscillator select signal OscSel[1], respectively. Clock enable selection block 35 decodes the contents of the oscillator select bits and generates three clock select signals: primary clock select (A3), secondary clock select (B3), and tertiary clock select (N3). These three clock select signals are provided to the select input leads of clock multiplexer 40. Clock enable selection block 35 forces the three clock select signals A3, B3 and N3 to be mutually exclusive and thereby guarantees that only one clock source will drive the system clock at any given time.

FIG. 7 is a table setting forth the decoding function performed by clock enable selection block 35. Oscillator select signals OscSel[1:0] are first received by decoder 51 (see FIG. 3) of clock enable selection block 35. The various combinations of the oscillator select bits 43 and 44 of oscillator control register 25 are set forth in the right column of the table of FIG. 7. For example, if bit one 44 and bit zero 43 are [00], respectively, then clock enable selection block 35 asserts the primary clock select signal PriClkSel (A3). Assertion of PriClkSel (A3) causes clock multiplexer 40 to gate the clock signal on a data input lead 57 onto system clock line 24. If the oscillator select bits 44 and 43 have values of [01], then clock enable selection block 35 asserts the secondary clock select signal SecClkSel (B3) as indicated by the second row of the table. Assertion of SecClkSel (B3) causes clock multiplexer 40 to gate the secondary clock signal (SecClk) on its data input lead 58 onto system clock line 24. Similarly, if the oscillator select bits 44 and 43 are [10], then clock enable selection block 35 asserts the tertiary clock select signal TerClkSel (N3), which in turn causes clock multiplexer 40 to gate the tertiary clock signal TerClk on data input lead 59 onto system clock line 24. If the oscillator select bits 44 and 43 are [11], then none of the clock select signals PriClkSel, SecClkSel or TerClkSel is asserted, and clock multiplexer 40 gates the ground potential on its data input lead 60 onto system clock SysClk line 24.

Figure 8:
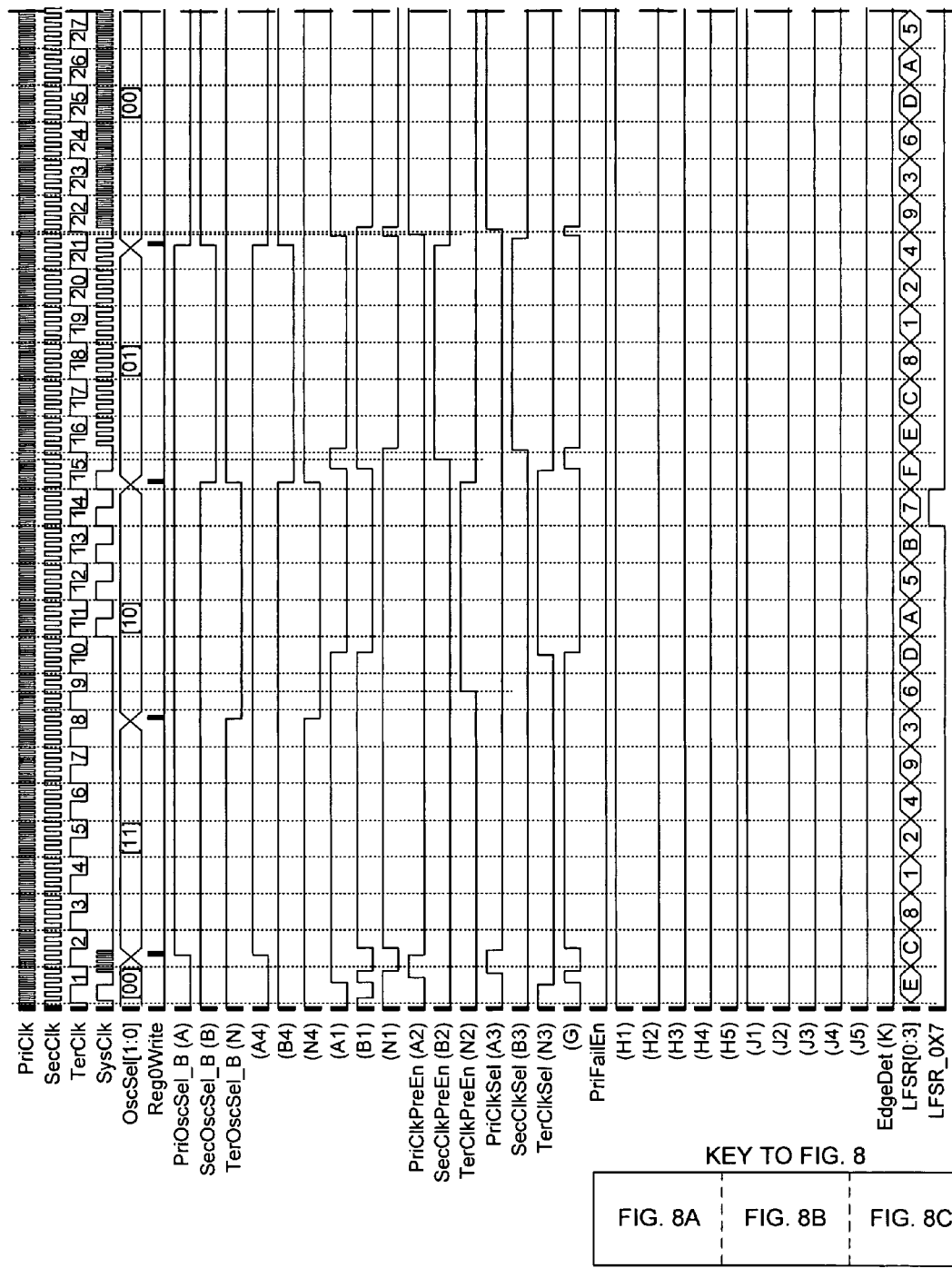
FIGS. 8A, 8B and 8C are waveform diagrams illustrating the operation of the microcontroller integrated circuit of FIG. 1.
Figure 8B:
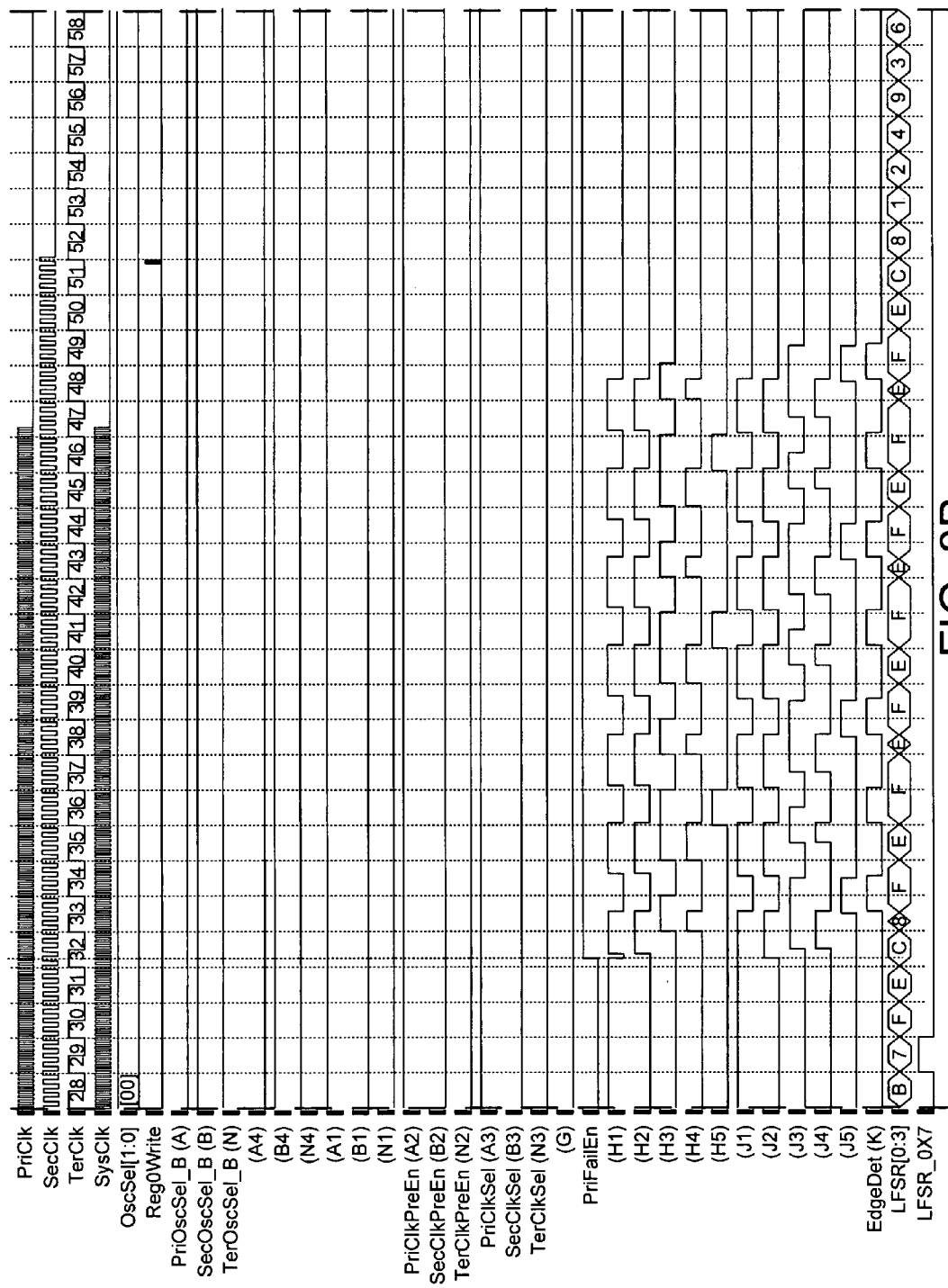
Figure 8C:
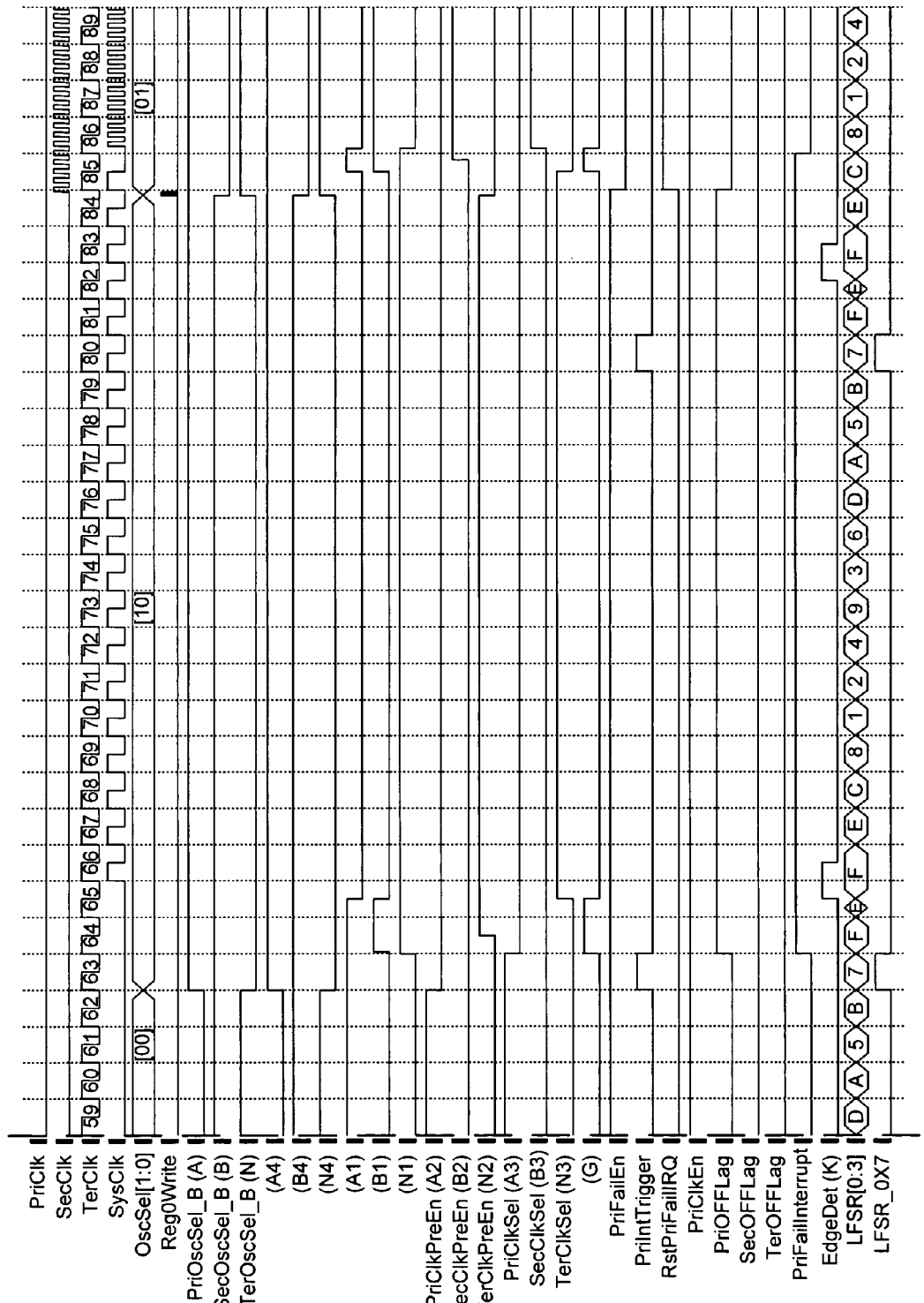

FIGS. 8A, 8B and 8C are a waveform diagram illustrative of an operation of microcontroller integrated circuit 11 of FIG. 1. The signal names in the left column of FIG. 8A correspond to the signal names in the circuit diagrams of FIGS. 1 through 6. In the example shown in FIGS. 8A, 8B and 8C, the primary clock PriClk is a 800 MHz signal, the secondary clock SecClk is a 400 MHz signal, and the tertiary clock TerClk is an 100 MHz signal. Although for ease of illustration of the waveforms, the frequencies of the clock sources in FIG. 8 vary by only a factor of eight, microcontroller integrated circuit 11 also operates with clock sources having other frequencies, such as a 10 kHz watchdog timer and a 5 MHz internal precision oscillator. In one example, a 10 kHz watchdog timer consumes about 6 microwatts (2 microamperes at 3 volts) of power, whereas a 5 MHz internal precision oscillator consumes about 3 milliwatts (1 milliampere at 3 volts) of power.

The periods of the tertiary clock in FIG. 8 are numbered as indicated by the numerals appearing in the TerClk waveform. Operation of microcontroller integrated circuit 11 is shown through fifty-eight periods of TerClk. As of period 1, each of the clock sources has been enabled by writing digital ones to the three clock enable bits 48, 49, and 50 of oscillator control register 25. For example, by writing a digital one to bit six 49, the secondary clock enable signal SecClkEn is asserted, and internal precision oscillator 19 is turned on, begins oscillating, and consumes power. For purposes of illustration, internal precision oscillator 19 is disabled to conserve power after a digital zero is written to bit six 49 by write strobe Reg0Write at the end of period 51 in FIG. 8B.

The operation of microcontroller integrated circuit 11 in TerClk period 2, as shown in FIG. 8A, illustrates how the system clock signal SysClk on system clock line 24 can be turned off. Initially, the values of oscillator select bits 44 and 43 in oscillator control register 25 are [00], and clock multiplexer 40 selects PriClk as the system clock SysClk. Processor 15 then causes oscillator select bits 44 and 43 to be written with the values [11] during period 2 in response to write strobe signal Reg0Write. As indicated by the table of FIG. 7, each of clock select signals A3, B3 and N3 is deasserted when oscillator select bits OscSel[1:0] 44 and 43 have the values [11]. Thus, clock multiplexer 40 causes the grounded multiplexer data input lead 60 to be coupled to system clock line 24 when the values of OscSel[1:0] are [11]. The SysClk waveform illustrates that the writing of OscSel[1:0] with [11] effectively stops the SysClk.

Although disabling the system clock supplied to the processor would disable the processor and stop its further operation, a second write strobe is shown in period 8 of FIG. 8A to illustrate what would happen if processor 15 were to load OscSel[1:0] with the value [10]. The value [10] corresponds to the tertiary clock as indicated in the table of FIG. 7. Accordingly, the system clock signal SysClk begins switching at the tertiary clock frequency at the beginning of period 11 in response to the write strobe in period 8.

Figure 9:
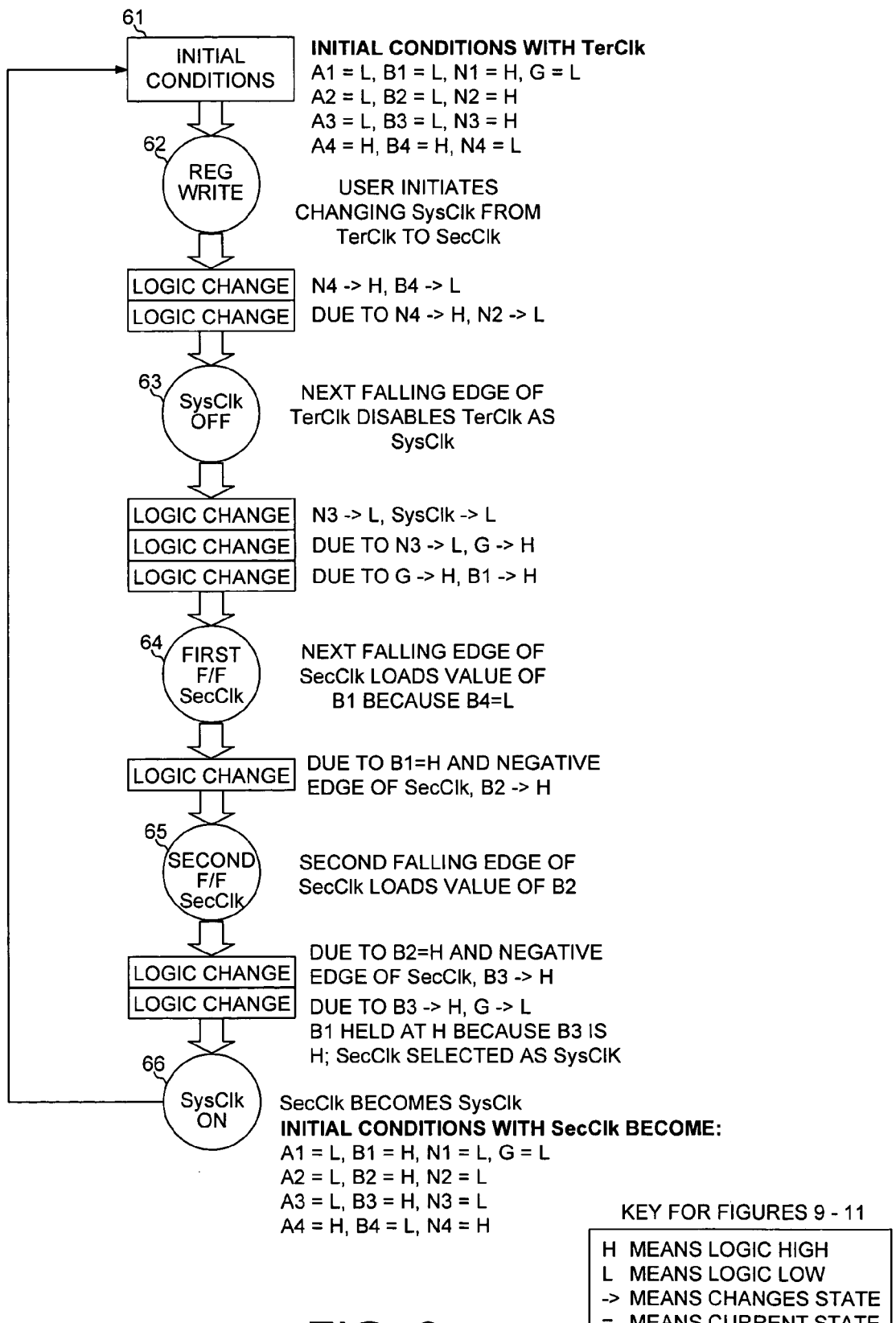
FIG. 9 is a flowchart showing steps for switching from a tertiary clock signal to a faster secondary clock signal as illustrated by the waveforms in FIG. 8A.

FIG. 9 is a flowchart showing steps by which clock enable selection block 35 of FIG. 3 can advantageously switch signal SysClk from a first clock signal to a second clock signal without introducing an undesirable glitch onto system clock input lead 20 of processor 15. The process of switching from one clock source to another without introducing glitches onto the system clock input lead is explained in detail in connection with switching the clock source from the tertiary clock signal TerClk to the faster secondary clock signal SecClk in period 15 in FIG. 8A. FIG. 9 sets forth the states of the various signals within clock enable selection block 35 as the operation of the circuit proceeds during period 15 of TerClk.

Initially (step 61), oscillator select bits OscSel[1:0] 44 and 43 have the values [10]. TerClk is therefore the source of SysClk. FIG. 9 shows the initial states of various signals on nodes within the clock enable selection block 35 of FIG. 3. Signals A4 and B4 are high, so negative edge triggered flip-flops 83 and 69 are maintained in an asynchronous cleared state.

In step 62, processor 15 writes the values [01] into oscillator select bits OscSel[1:0] on the rising edge of TerClk (the current SysClk). Once oscillator control register 25 has been written to select SecClk by outputting an oscillator select signal OscSel[1:0] of [01], pre-enable flip-flop 67 of clock enable selection block 35 is asynchronously cleared, and a TerClkPreEn signal (N2) is deasserted. Flip-flop 67, as well as the other flip-flops of clock enable selection block 35, are negative-edge-triggered D flip-flops.

Step 63 occurs upon the next falling edge of TerClk, the current clock signal. On the falling edge of TerClk, an enable flip-flop 68 of clock enable selection block 35 clocks in the digital low value of N2 and therefore drives the TerClkSel signal (N3) low. As a consequence, each of clock select signals A3, B3 and N3 is now deasserted. Clock multiplexer 40 therefore selects ground potential on multiplexer data input lead 60. SysClk on system clock input lead 20 of processor 15 is therefore held low. By holding SysClk low while switching to a new clock source, clock controller 16 prevents an extremely short cycle from occurring between the last falling edge of the old clock (TerClk) and the first rising edge of the new clock (SecClk). The clock source used to clock processor 15 is therefore switched without introducing glitches onto system clock input lead 20.

Step 64 occurs upon the next falling edge of the new SysClk, which is SecClk, after all clock sources are decoupled in step 63 from system clock input lead 20. A first, pre-enable flip-flop 69 of clock enable selection block 35 drives the SecClkPreEn signal (B2) high. Thus, SecClk, the newly selected clock, is pre-enabled.

In step 65, SecClk is enabled on the next falling edge of SecClk. A second, enable flip-flop 70 of clock enable selection block 35 clocks in the digital high value of B2 and therefore drives the SecClkSel signal (B3) high. As a consequence, clock multiplexer 40 selects SecClk on its data input lead 58 to be the active system clock and this happens when SecClk is low.

In step 66, the next rising edge of SecClk causes a rising edge of SysClk because SecClk is now gated onto system clock input lead 20 of processor 15. The total time taken to switch from an old clock to a new clock is one cycle of the old clock plus one and one half cycles of the new clock, counting from the time processor 15 writes into oscillator select bits OscSel[1:0] on the rising edge of the old clock (TerClk) until the first rising edge of the new clock (SecClk).

Figure 10:
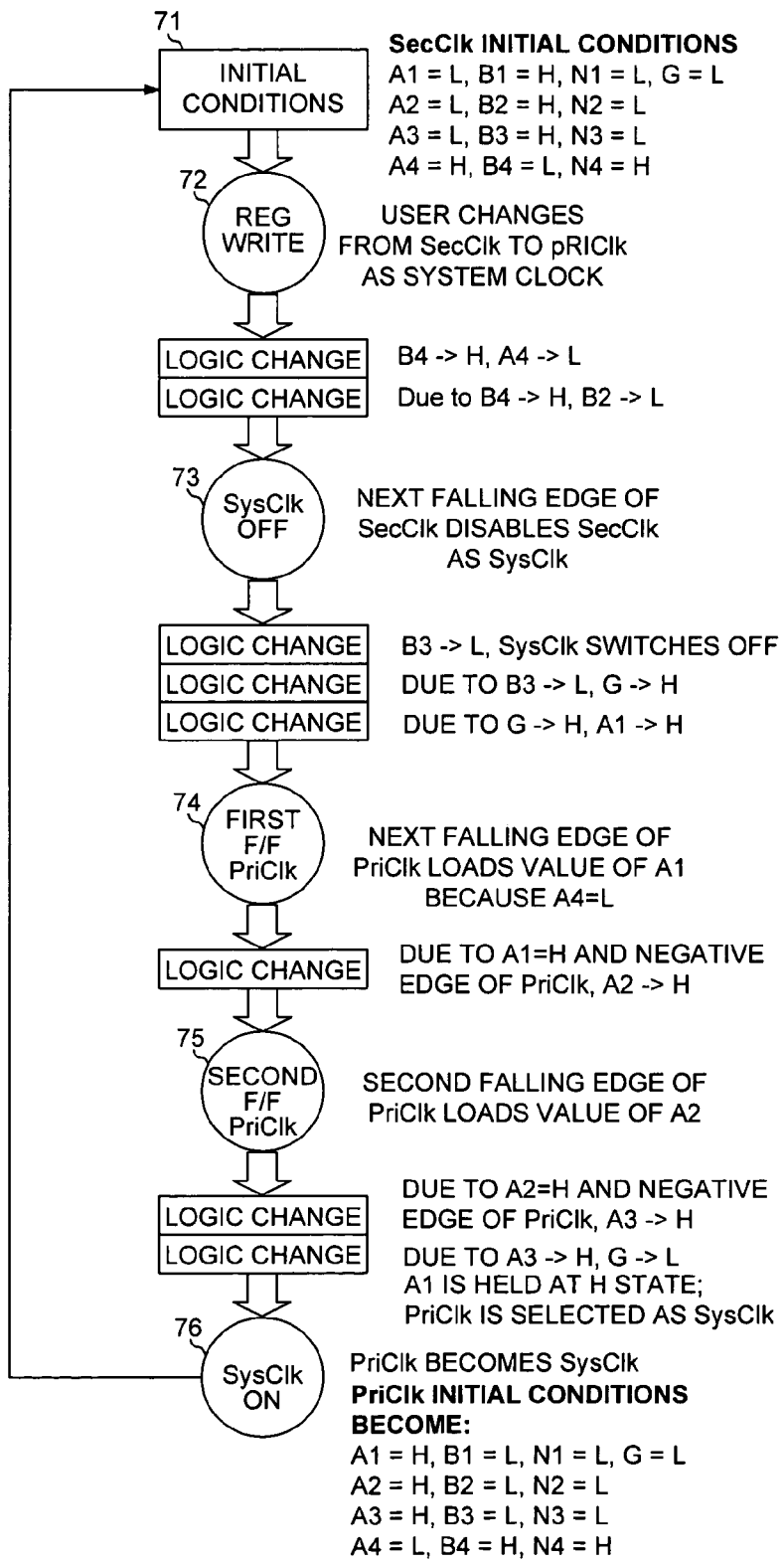
FIG. 10 is a flowchart showing steps for switching from a secondary clock signal to an even faster primary clock signal as illustrated by the waveforms in FIG. 8A.

FIG. 10 is a flowchart showing the steps by which clock enable selection block 35 switches the clock source from the secondary clock signal SecClk to the even faster primary clock signal PriClk starting at period 21 in FIG. 8A. The process for switching from SecClk to PriClk in steps 71 through 76 is analogous to the process described by steps 61 through 66.

Figure 11:
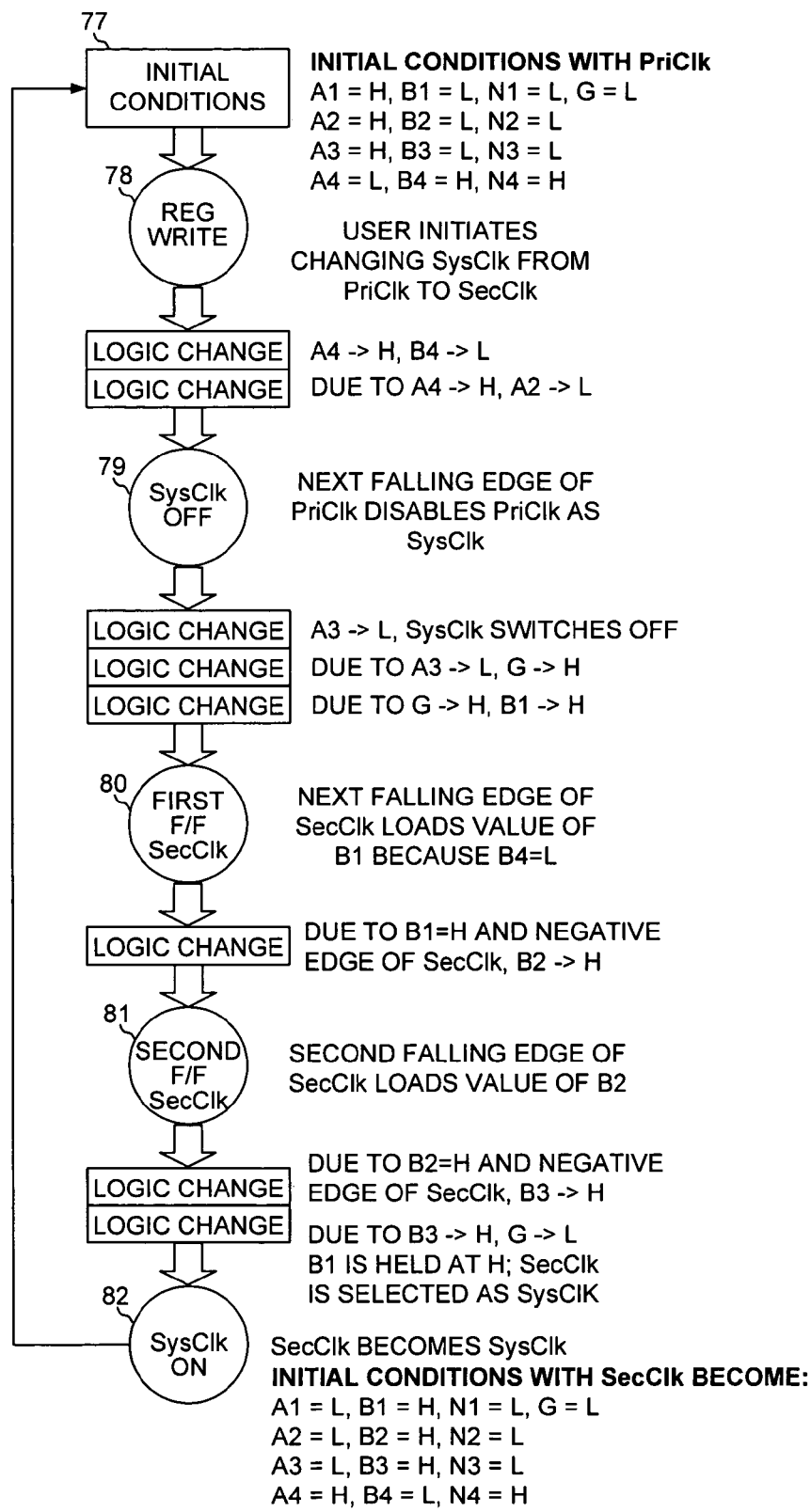
FIG. 11 is a flowchart showing steps for switching from a faster primary clock signal to a slower secondary clock signal.

FIG. 11 is a flowchart showing steps 77 through 82 by which clock enable selection block 35 switches the system clock from a fast clock source to a slower clock source. For purposes of illustration, FIG. 11 shows how a faster clock signal PriClk is switched to a slower clock signal SecClk, although such a clock transition does not occur in the waveforms shown in FIG. 8. When switching from a faster PriClk to a slower SecClk, the fact that numerous PriClk transitions occur after step 79 and before the next falling edge of SecClk in step 80 does not affect the state of a first, pre-enable flip-flop 83 of clock enable selection block 35 because signal A4 holds first flip-flop 83 in a reset state. In situations where the transition of first flip-flop 83 occurs at the same time PriClk is disabled as SysClk, SysClk is absent for one SecClk clock pulse because an additional SecClk transition is required to switch to SecClk.

During the entire period of the waveforms shown in FIG. 8A, the circuitry of clock source fail detect blocks 37, 38 and 39 is disabled. The contents of each of bit two 45, bit three 46 and bit four 47 of oscillator control register 25 is zero. The output of these failure detect enable bits 45, 46 and 47 is provided as TerFailEn, SecFailEn and PriFailEn to clock source fail detect blocks 39, 38 and 37, respectively. As is apparent from FIG. 4, the output of primary clock source fail detect block 37 (the primary interrupt trigger signal PriInt-Trigger) is held low as a consequence of PriFailEn being deasserted to a digital logic low. In addition, the output of clock edge detection logic 53 (the edge detect signal Edge-Det (K)) is also held low as a consequence of PriFailEn being deasserted. FIG. 8A shows the edge detect signal EdgeDet being held low during the entire period of the waveforms in FIG. 8A, while the linear feedback shift register (LFSR) 54 reaches a predetermined terminal count value and then rolls over having counted through its entire sequence. In this example, LFSR is associated with the primitive polynomial $x^4+x+1$. LFSR 54 has fifteen unique states in its sequence, whose hexadecimal representation is: F, E, C, 8, 1, 2, 4, 9, 3, 6, D, A, 5, B, 7. In this example, the LFSR reset value is chosen to be [F], and the predetermined terminal count value is [7].

In order to illustrate the operation of clock edge detection logic 53, primary clock source fail detect block 37 is enabled in period 32 of FIG. 8B. Primary clock source fail detect block 37 is enabled when bit four 47 of oscillator control register 25 is written with a digital one, asserting the PriFailEn signal. In this example, PriClk is the tested clock, and TerClk acts as the timing clock TimingClk for LFSR 54. The frequency of the timing clock TimingClk determines how fast a failure or inadequacy in the tested clock can be detected. Falling edge detection portion 56 indicates that PriClk is operational (by asserting signal J5) at the falling edge of TimingClk in period 33. Consequently, EdgDet is asserted, and LFSR 54 is reset to starting value [F] at the falling edge of TerClk in period 33.

Rising edge detection portion 55 indicates that PriClk is operational (by asserting signal H5) at the rising edge of TimingClk in period 36. Consequently, EdgDet is asserted, and LFSR 54 is reset to starting value [F] at the rising edge of TerClk at the beginning of period 36.

The timeout value of LFSR 54 is determined by the values RstVal[3:0] present on the input leads of the AND gates in the upper right portion of oscillator failure detection logic 52. In this example, the timeout value of LFSR 54 is [7].

Although the timeout value is [7] in this example, the timeout value (for the particular waveforms of PriClk, SecClk and TerClk shown in FIG. 8B) could be set to [C]. LFSR 54 would not timeout before clock edge detection logic 53 determines that the clock source of SysClk is operational. Where the timeout value is set to [C], LFSR 54 would count through a sequence of three steps instead of the fifteen steps of this example.

Figure 12:
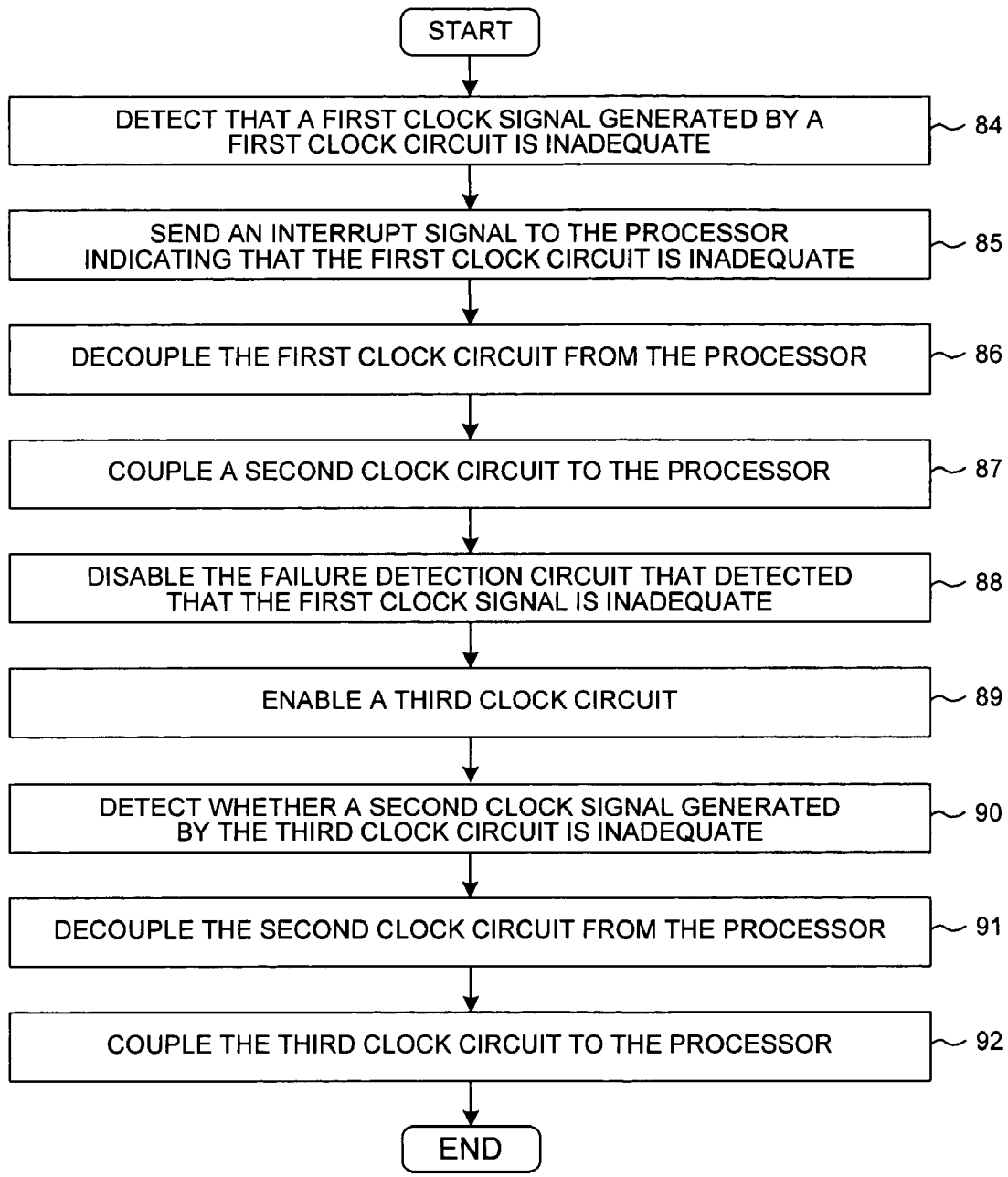
FIG. 12 is a flowchart of steps for automatically switching from a failed clock source to a backup clock source, enabling a third clock source, and finally switching to the third clock source.

FIG. 12 is a flowchart of steps 84 through 92 for automatically switching from a failed high-speed external clock source to an internal backup clock source, then enabling a high-speed internal clock source, and finally switching to the high-speed internal clock source. The steps of FIG. 12 by which microcontroller integrated circuit 11 automatically switches from a failed clock source to a new clock source will now be described using the example of the waveform diagrams of FIG. 8.

Beginning in period 22 of FIG. 8A, processor 15 is being clocked by the primary clock signal (PriClk) generated by high-speed precision external crystal oscillator 12, and SysClk is PriClk. Then in period 47, external crystal oscillator 12 fails. Primary clock source fail detect block 37 has been enabled in period 32 and, in step 84 of FIG. 12, detects that the primary clock signal (PriClk) is inadequate. In this example, the primary clock signal is detected to be inadequate if the primary clock signal stops oscillating.

After period 47, rising edge detection portion 55 outputs an indication that PriClk is not operational. Rising edge detection portion 55 indicates that PriClk has failed when the edge detect signal EdgeDet is not asserted at the rising edge of TerClk in period 51. LFSR 54 is not reset in period 51 and continues to count through its counting sequence. In period 63, as shown in FIG. 8C, LFSR 54 reaches the predetermined timeout value [7], and signal LFSR_0X7 is asserted. As a consequence, PriIntTrigger is also asserted.

The assertion of PriIntTrigger causes an interrupt signal (primary fail interrupt signal PriFailInterrupt) to be sent to processor 15 in step 85 of FIG. 12.

As shown in FIG. 2, primary clock source fail detect block 37 outputs PriIntTrigger onto an input lead of OR gate 42. Because PriIntTrigger is asserted, the output of OR gate 42 is a logic level high, which resets and sets bits 43 and 44 of oscillator control register 25. The output of OR gate 42 resets bit zero 43 with a digital zero and sets bit one 44 with a digital one. Thus, the oscillator select signal OscSel[1] is asserted, and the oscillator select signal OscSel[0] remains low in period 63 of FIG. 8C.

Clock enable selection block 35 receives the oscillator select signals OscSel[1:0]. When the values of OscSel[1:0] become [10], clock enable selection block 35 ultimately asserts TerClkSel (N3), forces the clock select signal A3 low and holds signal B3 low. In step 86 of FIG. 12, external crystal oscillator 12 is decoupled from processor 15 when signal A3 is forced low. The oscillator select signals OscSel[1:0] are received into clock enable selection block 35 by decoder 51. As shown in FIG. 8C, when the values of OscSel[1:0] become [10] in period 63, the tertiary oscillator select signal TerOscSel_B (N) is forced low, and PriOscSel_B (A) goes high. (Oscillator select signals A, B and N are active low.) As a result, signal N4 goes low, and A4 goes high. Because N4 goes low, the asynchronous reset signal supplied to pre-enable flip-flop 67 is removed, thereby permitting signal N2 later to be asserted.

Next, in period 64, an enable-not-active signal G is asserted, causing all of signals A1, B1 and N1 to go high or remain high. Because only the pre-enable flip-flop for the tertiary clock source (flip-flop 67) has been pre-enabled, only the tertiary clock pre-enable signal N2 is asserted at the next falling edge of TerClk in period 64. Upon the second falling edge of TerClk in period 65, flip-flop 68 clocks in the asserted N2 high value such that the tertiary clock select signal TerClkSel (N3) is asserted. In step 87 of FIG. 12, assertion of TerClkSel (N3) causes clock multiplexer 40 to gate the tertiary clock signal TerClk (on data input lead 59 of clock multiplexer 40) onto system clock line 24. Thus, the TerClk clock output of low-speed internal watchdog timer oscillator 18 is coupled to the system clock input lead 20 of processor 15. TerClk begins driving SysClk on the next rising edge of TerClk at the beginning of period 66. Thus, upon the failure of PriClk in period 47, clock controller 16 automatically switches the source of SysClk supplied to processor 15 from external crystal oscillator 12 to internal watchdog timer oscillator 18.

Figure 13:
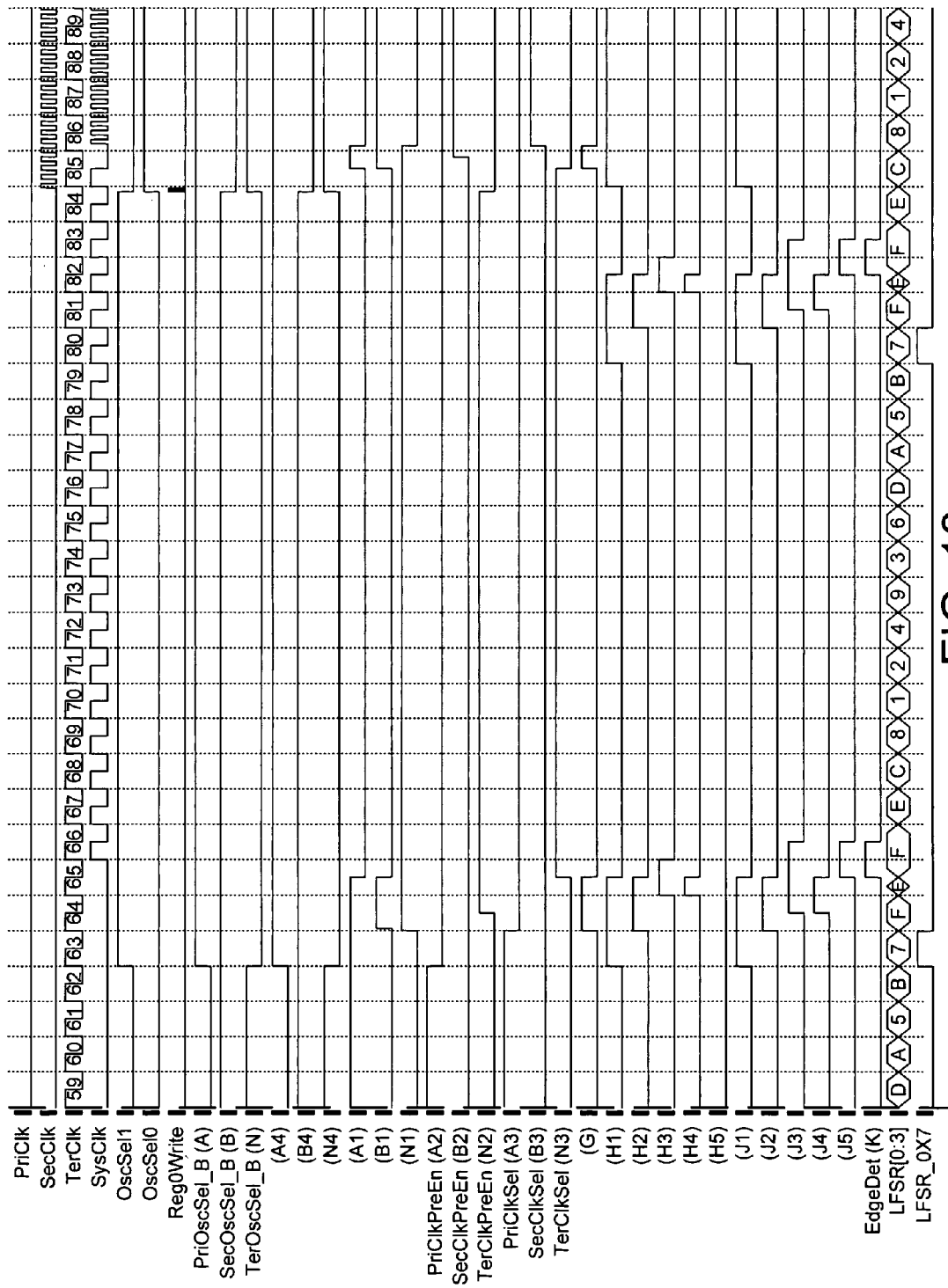
FIG. 13 is a waveform diagram illustrating the operation of the clock edge detection logic of the primary clock source fail detect block of FIG. 4 after a primary clock source has been found to be inadequate.

FIG. 8C also shows that LFSR 54 continues to timeout in periods 63 and 80 because primary clock source fail detect block 37 is not detecting edges of the now failed PriClk. For example, after LFSR 54 times out at the predetermined hexadecimal value [7] in periods 63 and 80, LFSR 54 rolls over to hexadecimal value [F]. LFSR 54 is then reset (by signal EdgeDet (K)) to hexadecimal value [F] on the falling edge of TerClk in periods 65 and 82. The operation of clock edge detection logic 53 and the repeated resetting of LFSR 54 while PriClk has failed is illustrated in FIG. 13.

Beginning at period 66 of FIG. 8C, processor 15 resumes executing instructions but is now clocked by the slow TerClk. The previous assertion of PriIntTrigger in period 64 caused an interrupt (PriFailInterrupt) to be sent to processor 15 in step 85 of FIG. 12. Processor 15 therefore now jumps to an interrupt service routine associated with PriFailInterrupt. To prevent further interrupt signals from being sent to processor 15 following the failure of PriClk, code in the interrupt service routine disables further assertions of PriIntTrigger by writing a digital logic high into the RstPriFailIRQ bit of fail interrupt register 26 (see RstPriFailIRQ in FIG. 2). The setting of this bit causes signal RstPriFailIRQ to be asserted high (after the end of period 84 in this example), which in turn prevents PriIntTrigger from being asserted high. The setting of this bit also causes the LFSR reset signal to be low, which in turn causes the asynchronous resetting of all the flip-flops of LFSR 54. LFSR 54 is therefore prevented from counting, thereby reducing power consumption. Thus, assertion of RstPriFailIRQ conserves power by preventing execution of further interrupt service routines, disabling primary clock source fail detect block 37 (step 88 of FIG. 12), and stopping LFSR 54 from counting.

After microcontroller integrated circuit 11 automatically switches the source of SysClk from the failed high-speed external crystal oscillator 12 to low-speed internal watchdog timer oscillator 18, processor 15 can write to and read from registers 25 and 26, albeit slowly. Microcontroller integrated circuit 11 then enables high-speed internal precision oscillator 19 in step 89 of FIG. 12.

Setting bit six 49 of oscillator control register 25 to a digital one asserts the SecClkEn signal which in turn causes the internal precision oscillator to be powered up and start oscillating. After high-speed internal precision oscillator 19 is enabled, secondary clock source fail detect block 38 detects (step 90 of FIG. 12) whether SecClk is indeed operational or has failed. In this example, SecClk is operational.

After high-speed internal precision oscillator 19 is powered up, the clock source is switched from internal watchdog timer oscillator 18 to internal precision oscillator 19.

In the illustrated example, both the powering up of the internal precision oscillator and the switching of the clock source from the internal watchdog timer oscillator 18 to internal precision oscillator 19 are initiated under software control by performing a single write (at period 84 in FIG. 8C) to the oscillator control register 25. Setting OscSel[1:0] to [10] causes TerClk to be decoupled from processor 15 (step 91 of FIG. 12) and causes SecClk to be coupled to processor 15 (step 92 of FIG. 12). The decoupling of one clock source and the coupling of another clock source to the system clock input lead 20 of processor 15 without introducing glitches onto the system clock input lead is performed as set forth above by the clock enable selection block 35 of FIG. 3. Microcontroller integrated circuit 11 switches from low-speed internal watchdog timer oscillator 18 to high-speed internal precision oscillator 19 starting at period 84 in the same manner as SysClk is switched from TerClk to SecClk starting in period 15 and described above in steps 61 through 66.

The single write of oscillator control register 25 also writes a digital zero to bit four 47, thereby deasserting PriFailEn. Deasserting PriFailEn prevents clock edge detection logic 53 of the primary clock source fail detect block 37 from switching, even if RstPriFailIRQ is not asserted and LFSR 54 is allowed to continue to timeout. Preventing clock edge detection logic 53 from switching reduces power consumption. It is therefore seen that power consumption is reduced in the entire process of switching from the failed clock source PriClk to the powered up SecClk by: 1) holding LFSR 54 in a reset state, 2) disabling clock edge detection logic 53 from switching, and 3) preventing the output of unnecessary interrupts to processor 15 that would otherwise be caused due to the repeated detection of the failed PriClk.

Although the present invention has been described in connection with certain specific embodiments for instructional purposes, the present invention is not limited thereto. In the specific embodiment of FIG. 1, internal precision oscillator 19 does not have an external crystal. In other embodiments, the internal precision oscillator has an external component, such as an external crystal. In some embodiments, an internal precision oscillator is powered up prior to the source of the clock signal supplied to the processor being switched from the failed external oscillator to the backup internal oscillator. Each of the primary, secondary and tertiary clock sources can be either internal to the microcontroller integrated circuit or external to the microcontroller integrated circuit. The RC circuit of an internal watchdog timer oscillator may be either internal to the microcontroller integrated circuit or external to the microcontroller integrated circuit. Although three clock source fail detect blocks are present in the specific embodiment described above, a clock controller can include one, two, three or more clock source fail detect blocks, depending on the number of clock signals that are to be monitored. Accordingly, various modifications, adaptations, and combinations of various features of the described embodiments can be practiced without departing from the scope of the invention as set forth in the claims.

What is claimed is:

1. A method comprising:
   (a) detecting whether a first clock signal is inadequate, wherein the first clock signal is generated by a first clock circuit;
   (b) decoupling the first clock circuit from a system clock input lead of a processor after the detecting in (a), wherein the decoupling is not performed as a result of a signal from the processor;
   (c) coupling a second clock circuit to the system clock input lead of the processor after the decoupling in (b);
   (d) enabling a third clock circuit after the coupling in (c);
   (e) decoupling the second clock circuit from the system clock input lead of the processor after the enabling in (d); and
   (f) coupling the third clock circuit to the system clock input lead of the processor after the decoupling in (e).

2. The method of claim 1, wherein the first clock circuit is a high-speed, external crystal oscillator, wherein the second clock circuit is a low-speed, internal watchdog timer, and wherein the third clock circuit is a high-speed, internal oscillator.

3. The method of claim 1, wherein the detecting in (a) is performed by detecting no signal edges of the first clock signal during a time period over which a linear feedback shift register increments to a predetermined value.

4. The method of claim 1, wherein the second clock circuit generates a signal whose frequency is lower than that of the first clock signal, and wherein the second clock circuit and the processor are parts of a single integrated circuit.

5. The method of claim 1, wherein the coupling the second clock circuit in (c) is not performed as a result of a signal from the processor.

6. The method of claim 1, wherein the third clock circuit is enabled in (d) by powering up the third clock circuit.

7. The method of claim 1, further comprising, between step (a) and step (b):

(g) sending an interrupt signal to the processor indicating that the first clock circuit has failed.

8. The method of claim 1, further comprising, between step (a) and step (b):
(g) disabling a failure detection circuit that performed the detecting in (a).

9. The method of claim 1, further comprising, between step (d) and step (e):
(g) detecting whether a second clock signal is inadequate, wherein the second clock signal is generated by the third clock circuit.

10. The method of claim 1, wherein the first clock circuit can be coupled to the system clock input lead by a multiplexer, the first clock circuit being coupled to a first data input lead of the multiplexer, wherein the second clock circuit is coupled in (c) to the system clock input lead by the multiplexer, the second clock circuit being coupled to a second data input lead of the multiplexer, wherein a third data input lead of the multiplexer is grounded, and wherein between step (b) and step (c) the multiplexer couples the third data input lead of the multiplexer to the system clock input lead.

11. An integrated circuit, comprising:
(a) a processor with a system clock input lead;
(b) a terminal, the terminal coupled to a first clock circuit, the first clock circuit generating a first clock signal;
(c) a second clock circuit;
(d) a third clock circuit; and
(e) a clock controller coupled to the system clock input lead, wherein the clock controller is adapted to decouple the system clock input lead from the terminal and to couple the system clock input lead to the second clock circuit upon detecting that the first clock signal has failed, and wherein the clock controller is further adapted to turn on the third clock circuit upon detecting that the first clock signal has failed and wherein the clock controller decouples the system clock input lead from the second clock circuit and couples the system clock input lead to the third clock circuit.

12. The integrated circuit of claim 11, wherein the first clock circuit is a high-speed external crystal oscillator.

13. The integrated circuit of claim 11, wherein the second clock circuit is a low-speed, internal watchdog timer oscillator.

14. The integrated circuit of claim 11, wherein the clock controller can decouple the system clock input lead from the terminal when the processor is receiving an inadequate first clock signal.

15. The integrated circuit of claim 11, wherein the clock controller comprises a primary clock source fail detect circuit, and wherein the primary clock source fail detect circuit detects whether the first clock signal has failed.

16. The integrated circuit of claim 15, wherein the clock controller further comprises a secondary clock source fail detect circuit, and wherein the secondary clock source fail detect circuit detects whether a second clock signal has failed, wherein the second clock signal is generated by the third clock circuit.

17. The integrated circuit of claim 15, wherein the clock controller comprises a plurality of substantially identical clock source fail detect circuits, and wherein each of the clock source fail detect circuits detects whether a different clock signal has failed.

18. A microcontroller integrated circuit operable with an external first clock circuit, the microcontroller integrated circuit comprising:
(a) a processor having a system clock input lead;
(b) a terminal for receiving a first clock signal generated by the external first clock circuit;
(c) a second clock circuit;
(d) means for detecting whether the first clock signal is inadequate and, upon detecting that the first clock signal is inadequate, for decoupling the terminal from the system clock input lead and coupling the second clock circuit to the system clock input lead, wherein the means decouples the terminal from the system clock input lead and couples the second clock circuit to the system clock input lead without receiving any signal from the processor; and
(e) a third clock circuit, wherein the means turns on the third clock circuit upon detecting that the first clock signal is inadequate and wherein the means couples the system clock input lead to ground after decoupling the terminal from the system clock input lead and before coupling the second clock circuit to the system clock input lead.

19. The microcontroller integrated circuit of claim 18, wherein the means couples the system clock input lead to ground after decoupling the terminal from the system clock input lead and before coupling the second clock circuit to the system clock input lead.

20. The method of claim 1, wherein the second clock circuit is a low-power, RC oscillator.

21. The method of claim 1, wherein the third clock circuit is entirely on-chip and does not have an external crystal.

* * * * *